(12) United States Patent
Phipps

(10) Patent No.: US 9,498,804 B2
(45) Date of Patent: Nov. 22, 2016

(54) PIPELINE PIGS

(75) Inventor: John Phipps, Cheshire (GB)

(73) Assignee: COKEBUSTERS LTD., Chester (GB)

( * ) Notice: Subject to any disclaimer, the term of this patent is extended or adjusted under 35 U.S.C. 154(b) by 1043 days.

(21) Appl. No.: 12/317,815

(22) Filed: Dec. 30, 2008

(65) Prior Publication Data

US 2009/0165227 A1 Jul. 2, 2009

(30) Foreign Application Priority Data

Dec. 31, 2007 (GB) .................................. 0725347.9

(51) Int. Cl.
| | | |
|---|---|---|
| *B08B 9/04* | (2006.01) | |
| *B08B 9/055* | (2006.01) | |
| *F16L 55/26* | (2006.01) | |
| *F16L 55/40* | (2006.01) | |

(52) U.S. Cl.
CPC .............. *B08B 9/0553* (2013.01); *F16L 55/26* (2013.01); *F16L 55/40* (2013.01)

(58) Field of Classification Search
CPC .......... B08B 9/0553; F16L 55/40; F16L 55/26
USPC ........................... 15/104.061; 134/8; 152/210
See application file for complete search history.

(56) References Cited

U.S. PATENT DOCUMENTS

| | | | | |
|---|---|---|---|---|
| 646,545 | A * | 4/1900 | Novotny .................... | 15/104.061 |
| 929,110 | A * | 7/1909 | Reeser ...................... | 15/104.061 |
| 1,228,447 | A * | 6/1917 | Koenig ..................... | 152/179 |
| 3,220,455 | A * | 11/1965 | Sowko ...................... | 152/210 |
| 3,323,572 | A * | 6/1967 | Farah ....................... | 152/208 |
| 3,426,822 | A * | 2/1969 | Trendowski .............. | 152/210 |
| 3,651,530 | A | 3/1972 | Schultz | |
| 3,717,927 | A * | 2/1973 | Smith ........................ | 29/517 |
| 3,837,386 | A * | 9/1974 | Lejeune .................... | 152/210 |
| 3,987,831 | A * | 10/1976 | Walrave et al. ........... | 152/210 |
| 4,016,620 | A * | 4/1977 | Powers .................... | 15/104.061 |
| 4,077,079 | A | 3/1978 | Knapp | |
| 4,122,575 | A * | 10/1978 | Sagawa ................... | 15/104.061 |
| 4,242,771 | A | 1/1981 | Knapp | |
| 4,244,073 | A * | 1/1981 | Sagawa ................... | 15/104.061 |
| 4,267,217 | A | 5/1981 | Brooker | |
| 4,361,488 | A | 11/1982 | White et al. | |
| 4,406,031 | A | 9/1983 | Eimer et al. | |

(Continued)

FOREIGN PATENT DOCUMENTS

| | | | |
|---|---|---|---|
| EP | 1172155 | A2 | 1/2002 |
| GB | 2379258 | A | 3/2003 |
| JP | 05096261 | A * | 4/1993 |
| WO | WO 9535172 | A2 * | 12/1995 |
| WO | 98/37990 | A1 | 9/1998 |

OTHER PUBLICATIONS

"Durable." Merriam-Webster Dictionary. Jun. 7, 2012 <http://www.merriam-webster.com/dictionary/durable>.*

(Continued)

*Primary Examiner* — Joseph J Hail
*Assistant Examiner* — Joel Crandall
(74) *Attorney, Agent, or Firm* — The Dobrusin Law Firm, P.C.

(57) ABSTRACT

A scraper pig for cleaning tubes and pipelines comprising a flexible core provided with a casing in which scraper studs are embedded in a manner whereby they protrude sufficiently to perform a cleaning action when they are propelled through the tube. A method for the manufacture of the pig and the design of the stud is also provided.

20 Claims, 13 Drawing Sheets

(56) References Cited

U.S. PATENT DOCUMENTS

| | | | |
|---|---|---|---|
| 4,413,370 A | | 11/1983 | Payne et al. |
| 4,720,884 A | * | 1/1988 | Ralls .................. 15/104.061 |
| 4,919,180 A | * | 4/1990 | Linden .................. 152/210 |
| 5,090,079 A | * | 2/1992 | Allison et al. .......... 15/104.31 |
| 5,150,443 A | | 9/1992 | Wijnberg |
| 5,150,493 A | | 9/1992 | Sivacoe |
| 5,384,929 A | * | 1/1995 | Smith .................. 15/104.061 |
| 5,433,236 A | | 7/1995 | Zollinger et al. |
| 5,533,224 A | * | 7/1996 | Knapp .................. 15/104.061 |
| 5,924,158 A | | 7/1999 | Watts |
| 6,500,271 B1 | * | 12/2002 | Moore et al. .................. 134/8 |
| 6,814,115 B2 | * | 11/2004 | Ostrovskis .................. 152/210 |
| 7,032,636 B2 | * | 4/2006 | Salakari .................. 152/210 |
| 7,338,571 B2 | * | 3/2008 | Brivio et al. .................. 156/114 |
| 2002/0011124 A1 | | 1/2002 | Phipps |
| 2007/0095448 A1 | * | 5/2007 | Krahl et al. .................. 152/210 |

OTHER PUBLICATIONS

Kiyomiya et al. Translation of JP05-096261A. Jun. 19, 2013. Industrial Property Digital Library. <http://www.ipdl.inpit.go.jp/homepg_e.ipdl>.*
Kiyomiya et al. Translation of JP05096261A. Translated by the Mcelroy Translation Company.*
Co-pending U.S. Appl. No. 12/235,928, filed Sep. 23, 2008.
European Search Report, Application No. 07018690.3, dated Feb. 21, 2008.
United Kingdom Search Report, Application No. GB0725347.9, dated Apr. 24, 2008.
European Search Report, Application No. EP08022547, dated Jun. 2, 2009.

* cited by examiner

PIPELINE PIGS

CLAIM OF PRIORITY

The present application claims the benefit of the filing date of United Kingdom (GB) Patent Application No. 0725347.9 (filed Dec. 31, 2007) the contents of which are hereby incorporated by reference in their entirety.

FIELD OF INVENTION

The present invention relates to improvements in or relating to pipeline pigs.

BACKGROUND OF THE INVENTION

The term pig is used to refer to devices that are passed through pipelines or tubing whether for cleaning the pipelines or for monitoring the internal surfaces and thickness of the pipes or tubes and for separation of product within the pipe or tube. This invention is particularly concerned with pigs that can be used to clean the internal surfaces of pipelines or tubes from the inside usually by scraping debris from the internal surface.

Although the invention is particularly useful with tubing used in oil refinery furnaces for carrying the hydrocarbons that are to be subject to high temperatures, it may also be used in connection with other pipes and tubing.

The tubing systems in refinery furnaces such as those used for crude oil distillation, vacuum thermal crackers, visbreakers, delayed cokers and the like typically have a sinusoidal path through the furnace to optimise the exposure of the contents of the tube to the heat; this is frequently referred to as the furnace coil being serpentine. In a typical furnace or process fired heater the product to be treated usually passes downwardly through the tube system and in some furnaces the initial section of the tubing consists of an upper closely packed tubing section in which the temperature of the product to be treated is raised to the treatment temperature by convection heating. Typically the pre-heated product then passes down to a lower section of the tubing in which there is more space between the lengths of tubing and in this section the tubes are heated by radiant heat. Typically, in both sections the tube or process fired heater consists of straight sections joined by semicircular bend sections, known as u-bends.

In order for efficient and safe operation of such a tubular system it is important that the tubes are periodically cleaned to ensure that the walls of the tube are free from undesirable deposits which will likely lead to inefficient heat transfer to the contained fluid.

Traditionally furnace process tubes have been cleaned/decoked using the method known as 'steam air decoking'. More recently, since the mid 1990's, mechanical decoking or pig decoking has gained in favour in oil refineries around the world, widely replacing the practice of 'steam air decoking'. Mechanical decoking is carried out by driving an abrasive or scraper pig through the pipe or tube to scrape deposits from the internal surface of the pipe or tube. This can be accomplished by driving the abrasive pig through the tube under fluid pressure such as water pressure. For example pumping unit machinery having water tanks and pumps can be delivered to a refinery, linked up with the tubing within a refinery furnace to produce a circuit through which the cleaning pig may be driven under water pressure so that the debris obtained by the cleaning operation is removed from the tubing system in the water stream and can be separated from the water for disposal. The cleaning operation may be performed by several runs of the cleaning pig which can be in the same direction or in opposite directions. After the cleaning operation the tubing system may be inspected and traditionally this has been performed in a separate operation.

As previously mentioned it is known to send a pig through a pipeline for the purpose of clearing any blockage therein and for removing unwanted deposits that have formed on the inner wall thereof. Such a device finds application, for example, in the oil industry, especially for cleaning fired heater or furnace tubes in a refinery. Refinery fired heaters may be subjected to temperatures normally in excess of 200° C., and in specialist furnaces temperatures can exceed 700° C. Such conditions lead to the formation of carbonaceous deposits (coke) on the pipeline wall. A pig can then be forced therethrough under pressure of a fluid, for example water, such that the deposits are removed by friction as the pig scrapes along the pipeline wall. U.S. Pat. No. 5,924,158 discloses an exemplary pig suitable for this purpose. The pig may be passed through the pipeline, uni-directionally or bi-directionally, several times to remove the coke. This type of decoking is carried out after the furnace has been taken out of service and cooled down.

Examples of scraper pigs are given in U.S. Pat. No. 5,924,158; U.S. Pat. No. 5,150,493 and U.S. Pat. No. 4,244,073. According to U.S. Pat. Nos. 5,924,158 and 5,150,493 a 'scraper pig' may be driven through a furnace coil or pass by a controlled flow of a fluid, typically water. Both inventions are designed to scrape away hard deposits of coke and other material; both have appendages extending from the body of the pig for scraping the contamination away from the inner surface of the tube or piping and both are designed to be flexible to be able to negotiate short radius 180° U bends and box plug header direction changes. Typically the appendages are scraper studs mounted in the outside of the pig to scrape the internal surface of the tubing with which they are used.

In U.S. Pat. No. 5,150,443 a captured thread for screwing in various types of scraping appendage is provided. U.S. Pat. No. 5,924,158 provides a system of anchoring studs which uses compressed air to inflate the plastic casing in order to provide a secure and tight housing for the 'plurality of studs'. Both these systems have limitations in their design.

SUMMARY OF INVENTION

The present invention provides a scraper pig comprising a central cylindrical core provided with a casing extending substantially around the external surface of the cylindrical body said casing containing a pattern of studs projecting outwardly from the casing.

In a further embodiment the invention provides a process for the production of a scraper pig having a cylindrical core provided with a casing extending substantially around the external surface of the cylindrical core, said casing containing a pattern of studs projecting outwardly from the casing, wherein a strap comprising a removable matrix containing a pattern of studs projecting from the removable matrix is placed around the core within a mould and a hardenable material is then cast around the studs in the area between the core and the strap, the hardenable material is hardened to provide a casing bonded to the core and containing the projecting ends of the studs, and the removable matrix is removed to provide the scraper pig with the pattern of studs projecting outwardly from the casing.

The present invention provides the following improvements compared to the earlier scraper pigs previously discussed.

The scraper pigs may be made of a variety of polyurethane/isocyanate compounds.

The scraper pigs can be cast in a mould and have a bullet type shape with a bull nose at both ends to assist bi-directional passage through bends, u-bends and box or plug type headers.

A particular benefit of the present invention is that the scraper pigs can match firmness and durability with flexibility. Flexibility allows the pig to pass through geometric turns in the tubes which can generally be described as 'serpentine' in nature, or shape although the body of the pig must be firm enough to usefully press the scraping studs against the tube inner wall to achieve a cleaning efficiency.

Scraping studs are fitted to the pig body in a manner which is secure so that studs will remain firmly in the body of the pig and are not dislodged during the aggressive 'run' or 'passage' through a pipeline or tube system.

The scraping studs can readily be laid out in a pattern so that a true and full coverage is achieved to remove surface contamination from 360° of the inner tube wall. This may be achieved by producing a stud layout using Computer Aided Design (CAD) which can overcome the problems with earlier pigs which can leave thin longitudinal tracks of contamination untouched by the scraper pig.

The use of the casing to contain the scraper studs allows the core of the pig and the stud securing casing to be made from different materials. This enables more flexibility to be achieved in the properties of the pig as a whole. For example the core may be of a flexible material such as aerated thermoplastic and/or foam or a mix thereof which helps the pig to pass through the serpentine path of a tube and/or to negotiate irregularities in the internal surface of the pig. At the same time the casing which contains the studs can be of a harder material to provide firmness of support to the studs and enhance their scraping action. The material of the casing may be hardened by heat or by a catalyst or a combination of both. In addition casings with different patterns of studs can be used with the same core so the action of the pig can be tailored to the individual demands of particular pipeline or tubing that is to be cleaned.

The core of the pig is preferably of a flexible and durable material and which can be protected from deterioration by aggressive immersion in water. The flexibility being sufficient to pass through the serpentine passageway of a furnace tubular structure. However it should not be so flexible that the studs can be recessed extensively into the core so reducing their scraping action. It is preferred that a layer of the hardenable material is formed between the core and the base of the studs to prevent the studs sinking into the core. We have found that polyurethane is a particularly useful material from which to produce the core. It is preferred that the core be formed with a recessed central section providing an area for retention of the core that contains the studs. In a further preferment the core is provided with a torpedo type nose at one or preferably both ends to enable the pig to be propelled through the tube or piping it is designed to clean.

The optimum pattern of scraping studs protruding from the surface of the pig can be determined by computer assisted design according to the dimensions of the tube or piping that is to be cleaned. Typically the pattern will be such that the studs are staggered so that a 360° cleaning activity is accomplished with studs sequentially performing a scraping action on unscraped areas of the internal surface of the tubing as the pigs is driven through the tubing. In some instances it may be desirable that the unconstrained diameter is slightly larger than the internal diameter of the tubing, alternatively it may be desirable that it be substantially equal to the internal diameter of the tubing.

The studs employed in the present invention are designed to optimise the scraping action without causing damage to the inner surface of the tube or piping that is to be cleaned and at the same time they are designed to be firmly held within the casing to reduce the likelihood of their being pulled out of the casing by the forces generated in an aggressive run through the pipeline or tube system. The overall length of a stud is typically 10 to 20 millimeters preferably 12 to 16 millimeters and preferably the body of the stud is made of an aluminium alloy. We prefer that the stud has a round and fairly wide base the preferred dimension of the base will depend upon the tubing to be cleaned but we prefer that the base has a diameter of from 6 to 12 millimeters preferably 8 to 10 millimeters. In a further preferment the stud is provided with an intermediary shoulder to enhance the keying of the stud within the casing. We prefer that 3 to 6 millimeters preferably 4 to 5 millimeters of the stud project from the casing to provide the most effective scraping action. The studs preferably have a shaped tip to provide the ability to cut through the contamination in the tubing whilst minimising scratch damage to the tube metal surface. Hereagain the preferred shape of the tip will depend upon the pipe or tubing that is being cleaned but a relatively broad, flat tip with a slightly moulded dome of surface area less than that of the base is preferred. The tip is preferably of tungsten carbide or similar hard metal.

Once the desired pattern of the studs and the desired degree of protrusion of the studs beyond the casing has been determined a strap may be prepared with a pattern of holes corresponding to the desired pattern of studs and having a depth corresponding to the desired degree of protrusion of the studs from the core of the pig. Once the strap has been prepared the studs may be placed in the pattern of holes in the strap.

Separately the core of the desired size and shape may have been moulded. The core may then be placed in a mould, the strap containing the studs may be placed in the mould surrounding the central portion of the core with the studs protruding towards the core and establishing a gap between the strap base of the studs and the core. A hardenable material may then be provided to fill the gap between the strap and the core and the spaces around the studs. The hardenable material may then be hardened to form the casing of the pig of the present invention and so that it rigidly retains the studs and bonds to the flexible core. After hardening the mould may be opened and the strap removed to provide the pig with the desired pattern of externally projecting studs to accomplish the scraping operation for which the pig is designed.

It has been found that polyurethane is a particularly useful hardening material. It is also preferred that the materials used to mould the core and the casing are free from air bubbles which can cause weaknesses in the pig. In a preferred embodiment the materials are subjected to vacuum prior to casting and during any mixing operations required to produce the materials.

In a preferred embodiment the core is provided with a locating device whereby it can be centralised within the mould during the casting of the hardenable material. For example it may be provided with an integrally formed pin which can fit into a recess in the mould to centralise it during casting.

The manufacture of a pig according to the present invention is now illustrated by the following description in conjunction with the attached figures.

The pig of the present invention is typically cast in a series of sequential processes. In Step 1 the central core is cast using a polyurethane and thermoplastic mix which provides a flexible core for the pig providing a water resistant, lightweight compressible centre. This may be cast in a specially designed and fabricated aluminium mould made in 3 parts—top, middle and base, the size of which depends upon the tubing to be cleaned but they are typically of diameter from 2" to 12" and prepared in one quarter inch increments.

In Step 2 a strap mould and the stud layout are determined by taking the circumference of the pig body (of each size) and designing a stud layout usually one which will result in overall 360° coverage of studs when pressed against the inner wall of the tube or pipe to be cleaned.

The design directive is borne out of the structural engineering principle of a Uniformly Distributed Load (UDL). This is exemplified by the simple principle demonstrated by a person's ability to safely lie on a 'bed of nails'. In the preferred system as one stud's cutting track ends, the adjacent track is taken up by a stud from one of the following rows, and so on. In this way the full 360° can be covered, yet care must be taken to allow adequate hardened material between the studs to avoid weak spots in the pig body structure. The design should also take into account resistance to twisting. The design of the layout of the studs preferably therefore combines the following attributes.

Full and effective 360° coverage

UDL to avoid pressure points which may damage the tube being cleaned

Pattern layout which resists following any tracks or ruts which may be a feature of the tube wall or its pattern of contamination. This is particularly an issue when decoking tubes which have been allowed to build up lineal or spiral coke contamination lines left unremoved by previous and/or historic pig decoking using a pig of alternative design.

This can be accomplished by computer assisted design to produce the appropriate pattern. This pattern is then taken and positioned within a purpose built mould. A strap preferably of polyurethane is then cast to incorporate accurately positioned perforations designed to suit the stud body size. The strap is then cast in the mould so that it is ready to load with appendage studs in readiness for final casting around the core pig.

In the final step a casting mould is used into which is placed the central core which has preferably been provided with a locating device which allows the core to be placed into the final mould so that it positions itself in a precise location. The importance of this is to ensure that the harder casing of hardenable material is evenly wrapped around the core which is automatically held in the centre.

The final mould is recessed in the central section to accommodate the strap which is rolled to form a closed circle when inserted into the final mould preferably leaving a gap between the core and the base of the studs. With all parts thus assembled, the final mould can be closed and secured. The warmed and premixed hardenable material can then be poured into the mould to commence the casting procedure around the studs and to fill the gap between the core and the base of the studs.

Once cast on a heated plate, the mould is left for a period of time to allow setting of the hardenable material which is preferably polyurethane. When opened, the final mould allows removal of the casting strap, leaving all studs firmly held in the casing as part of the composite pig.

This sequential procedure casts the appendage studs inside the hardenable material as it sets in the moulding process. This form of anchorage is superior to all others forms and retains the studs in highly abrasive and aggressive environments. This ensures that the studs are able to act upon the inner tube surface contamination without being torn from the pig body. This improves efficiency of action in that it enables more contamination to be removed by each run of the pig through the tubing and gives the pig a longer life for several runs, backwards and/or forwards, within a serpentine tube system without the need to be frequently renewed or replaced. Taking this point to its natural conclusion, a scraper pig of the present invention removes coke contamination thoroughly and at a faster rate, typically expending less water and enabling an earlier return to productive service of the tube coil.

The pig of the present invention may be used for cleaning any piping or tubing. It is particularly useful when used in combination with an 'Intelligent Pig' such as that described in copending European Patent Application 07018690.3. The 'Intelligent Pig' is for monitoring a pipeline or tube coil in a convenient and time efficient manner by performing inspections of tube and piping from the interior of the tube or pipe.

The present invention further allows an IP to be introduced into the tubular system following a cleaning operation with the scraper pig of the present invention by substituting the IP for the cleaning pig. This enables the same pumping unit machinery and control system to be used for both the cleaning and inspection operations which is time saving and efficiency improving.

This combination of pig decoking and pig inspection by the IP enables the IP to find areas where coke remains. This can help the decoking operators to guide the scraper pig to areas where coke contamination remains, at the same time helping them to avoid wasting time running scraper pigs where no coke exists. This combination of decoking and inspection using the same machinery, equipment and manpower provides considerable time efficiency.

The pipeline or tube cleaning provided by the use of the scraper pig of the present invention may be integrated with the tube monitoring mechanisms which employ an intelligent pig. For example, a fluid pumping system may be connected up to the tubing system and a scraping or cleaning pig inserted into the launcher and then propelled through the tubing system by means of the fluid pressure. The fluid leaving the tubing system and containing the debris removed by the scraping operation can be observed, the debris removed and the clean fluid recycled. At some stage when the cleaning is substantially complete the fluid leaving the tubing system will become cleaner and contain less debris. At this time the cleaning pig can be replaced with an IP to check the effectiveness of the cleaning operation. In this way the same pumping system, fluid supply and control systems can be used for both cleaning and inspection is aspect of the present invention therefore provides that the possibility to combine decoking and inspection not only provides time efficiency but also provides economies of shared mobilisation and contractual responsibilities. The use of a single piece of specialist equipment to carry out the joint operation is an efficiency in many aspects.

BRIEF DESCRIPTION OF THE DRAWINGS

The preparation of a pig according to the present invention is illustrated by the accompanying drawings in which.

DETAILED DESCRIPTION OF A PREFERRED EMBODIMENT

Figure 1:
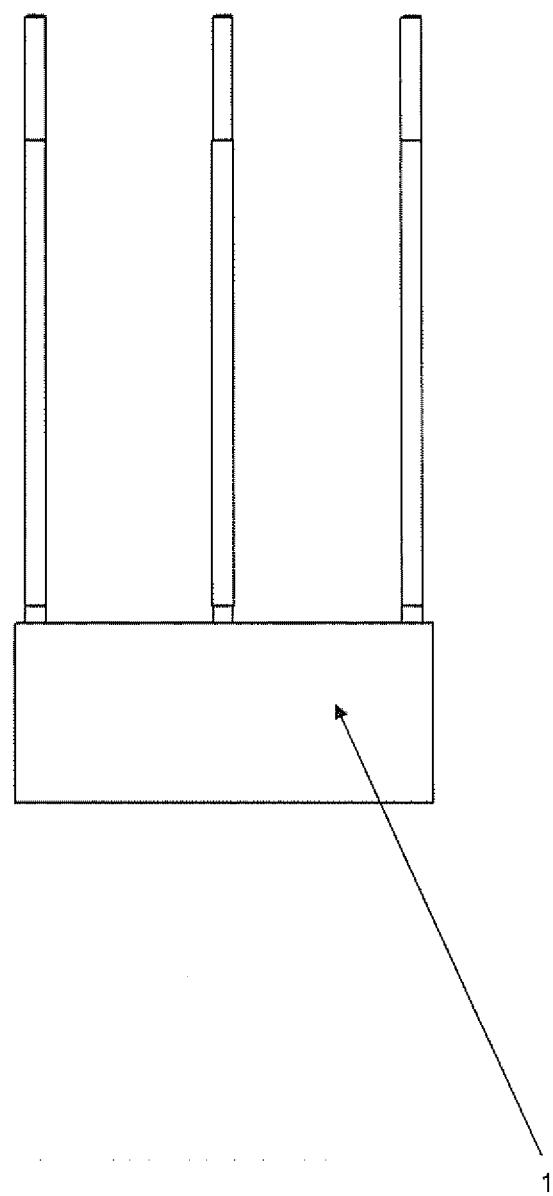
FIG. 1 shows a mould for the casting of a core.
Figure 2:
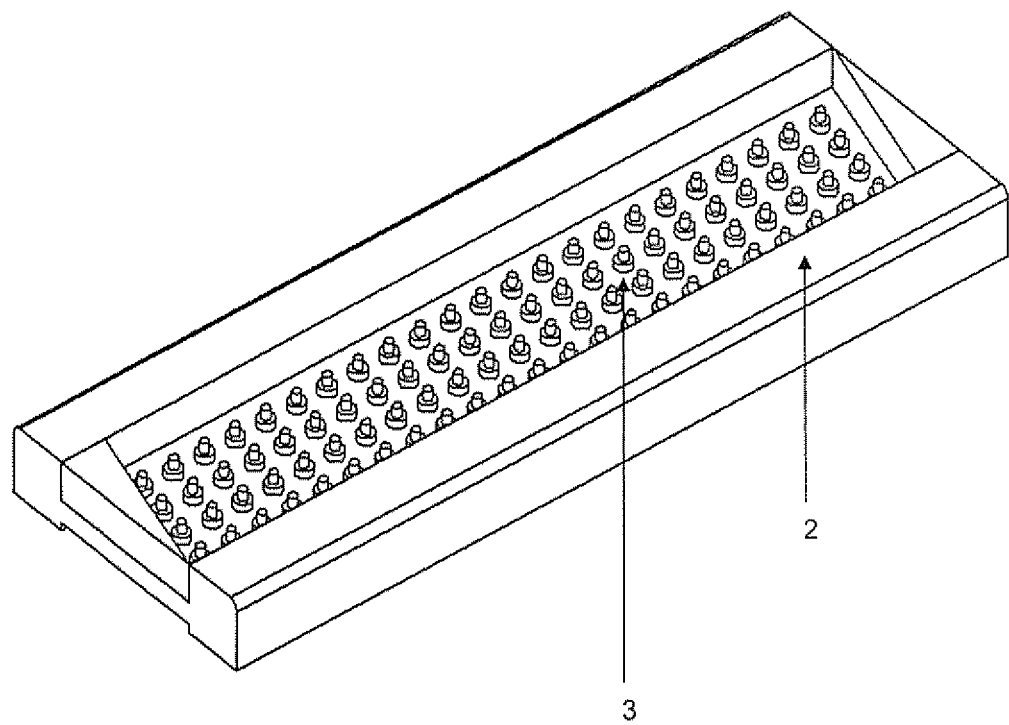
FIG. 2 shows the strap mould used to produce the strap.
Figure 3:
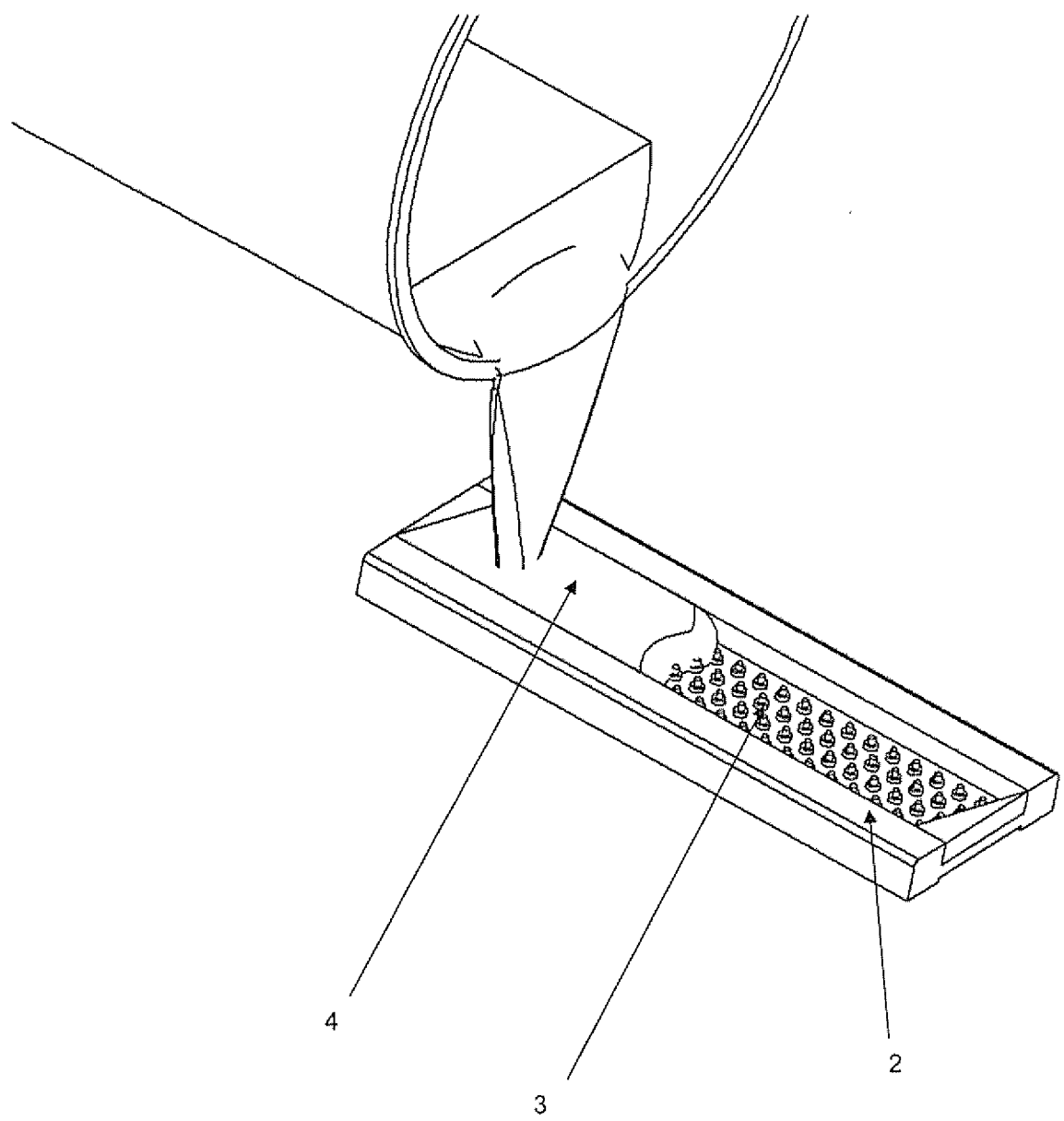
FIG. 3 shows the casting of the strap on the strap mould.
Figure 4:
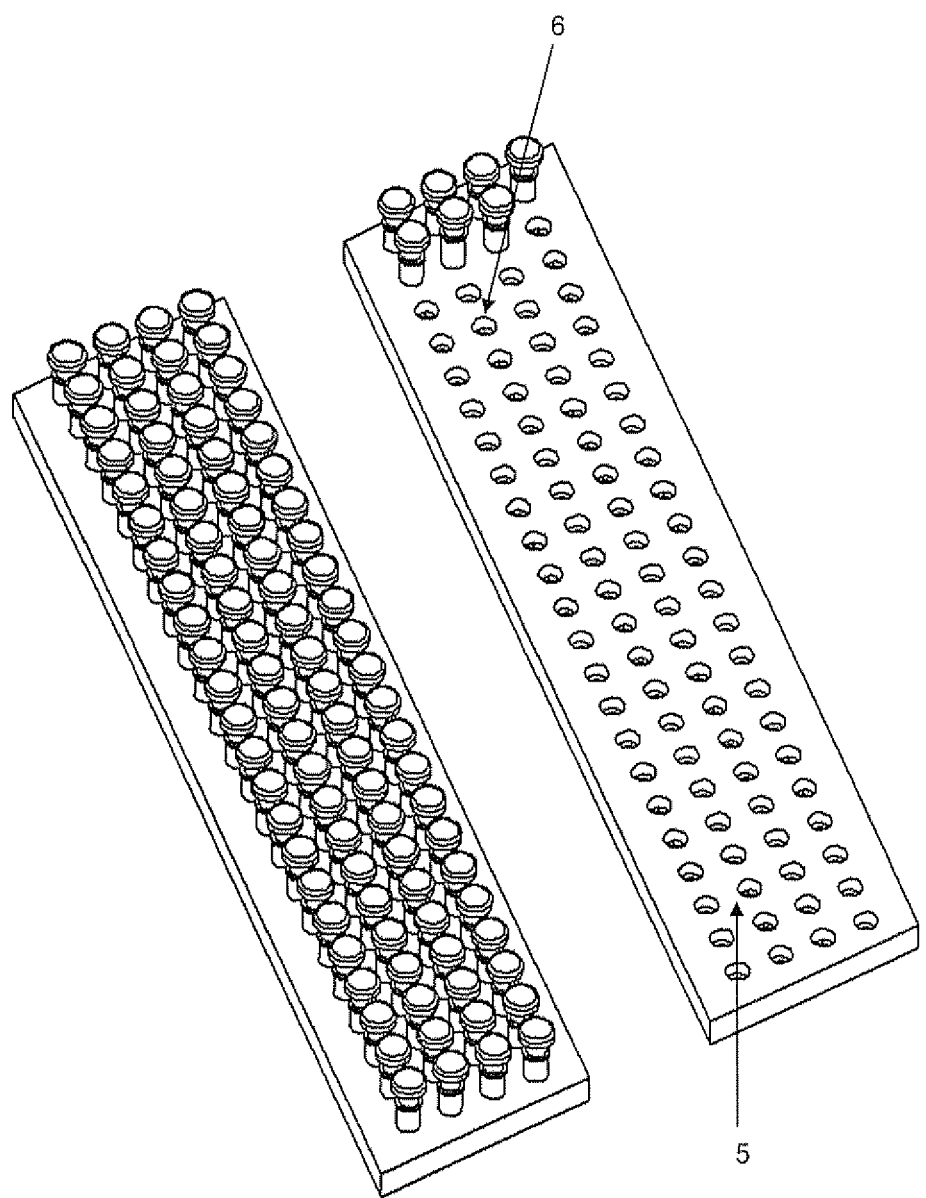
FIG. 4 shows the strap mould being loaded with studs.
Figure 5:
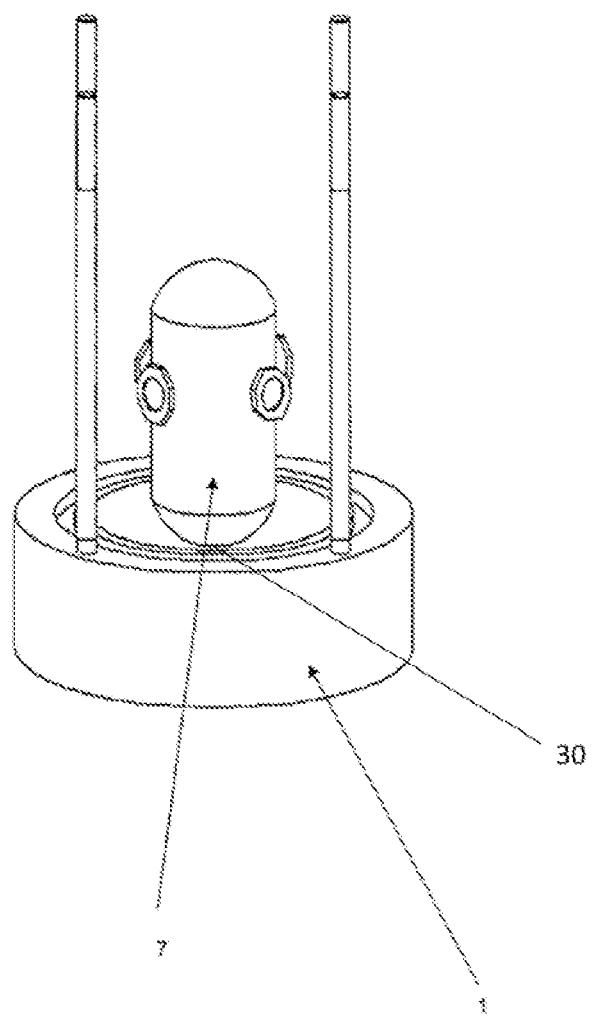
FIG. 5 shows the core mounted in the mould.
Figure 6:
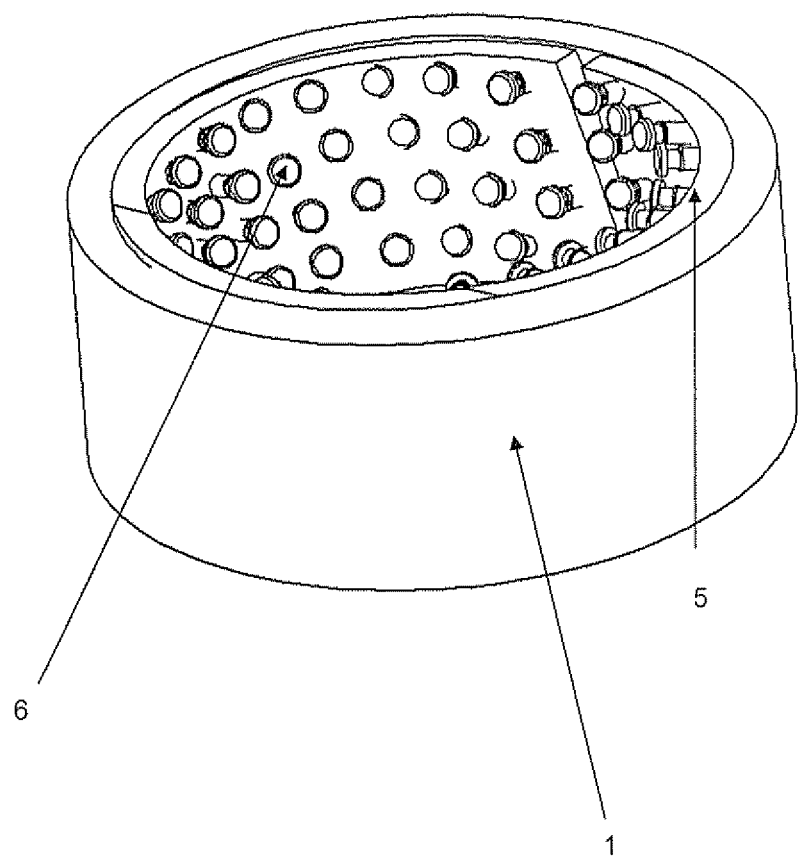
FIG. 6 shows the strap containing the studs being mounted in the mould.
Figure 7:
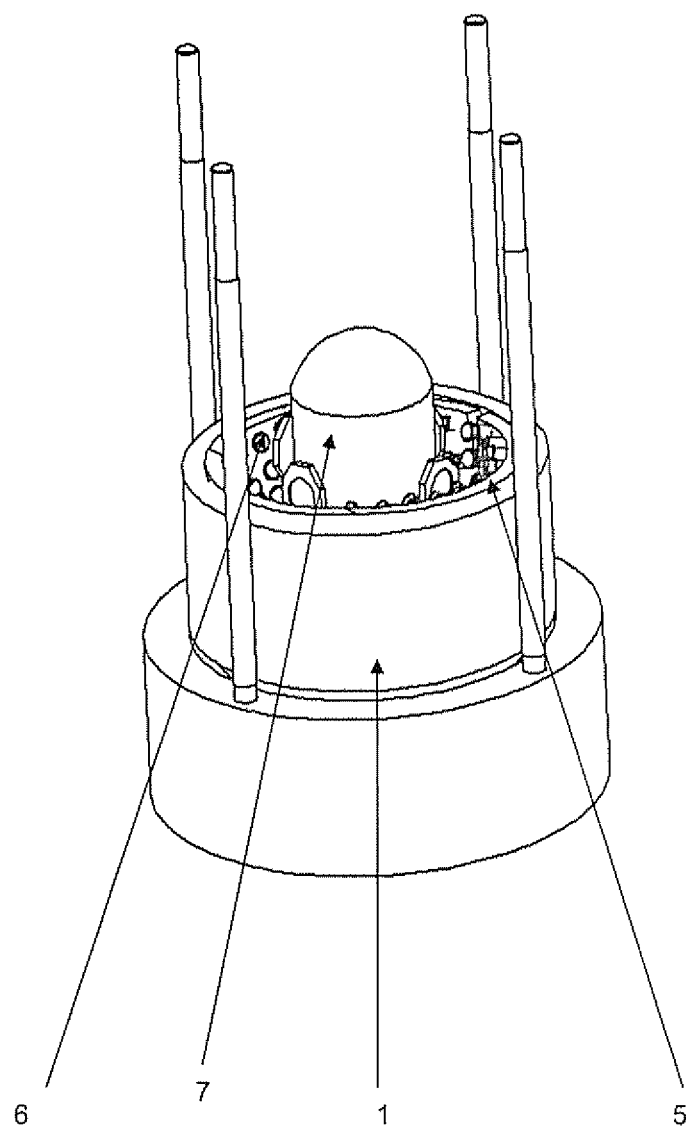
FIG. 7 shows the mould containing the core and the strap ready for the casting of the hardenable material.
Figure 8:
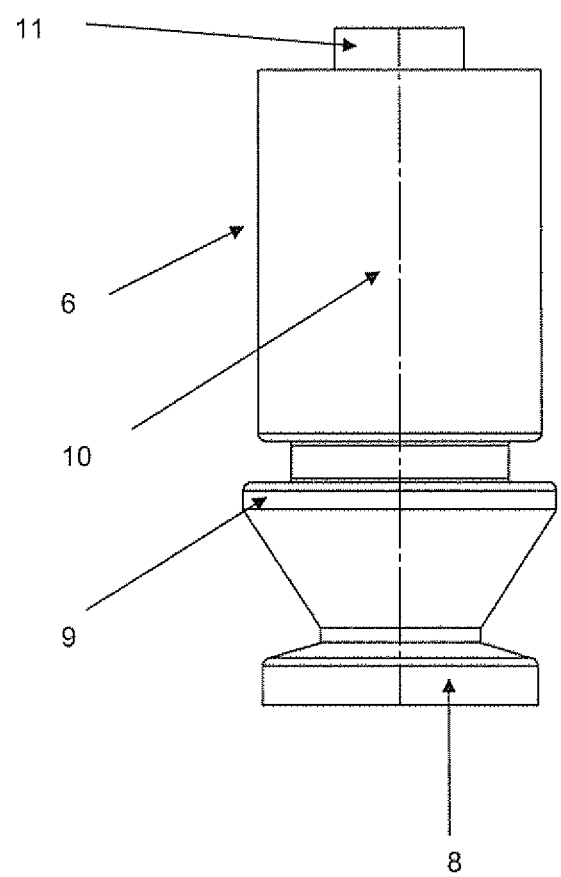
FIGS. 8 and 8A show a preferred form of a stud used in the present invention.
Figure 8A:
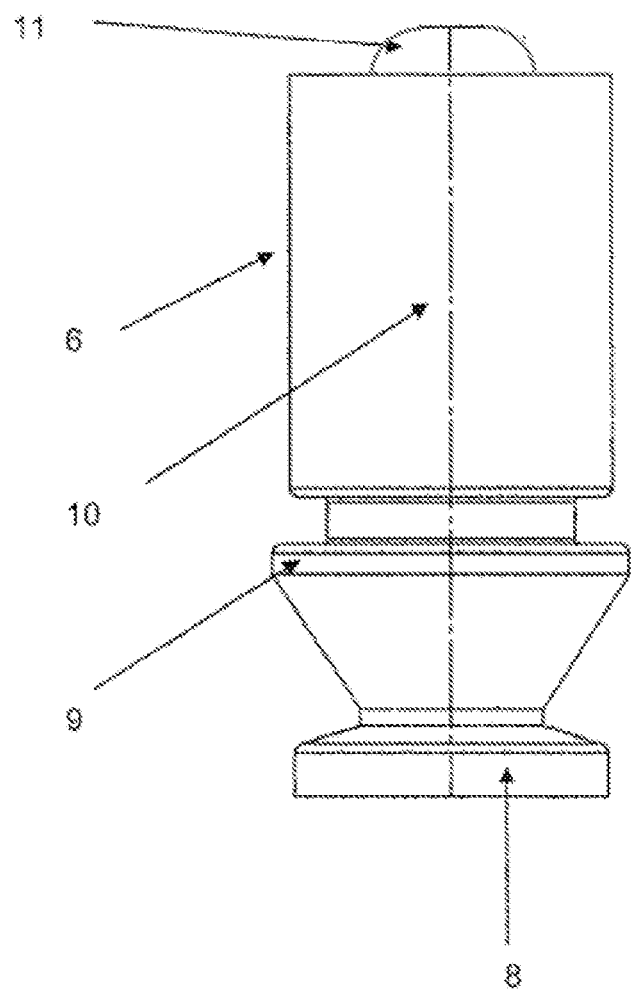
Figure 9:
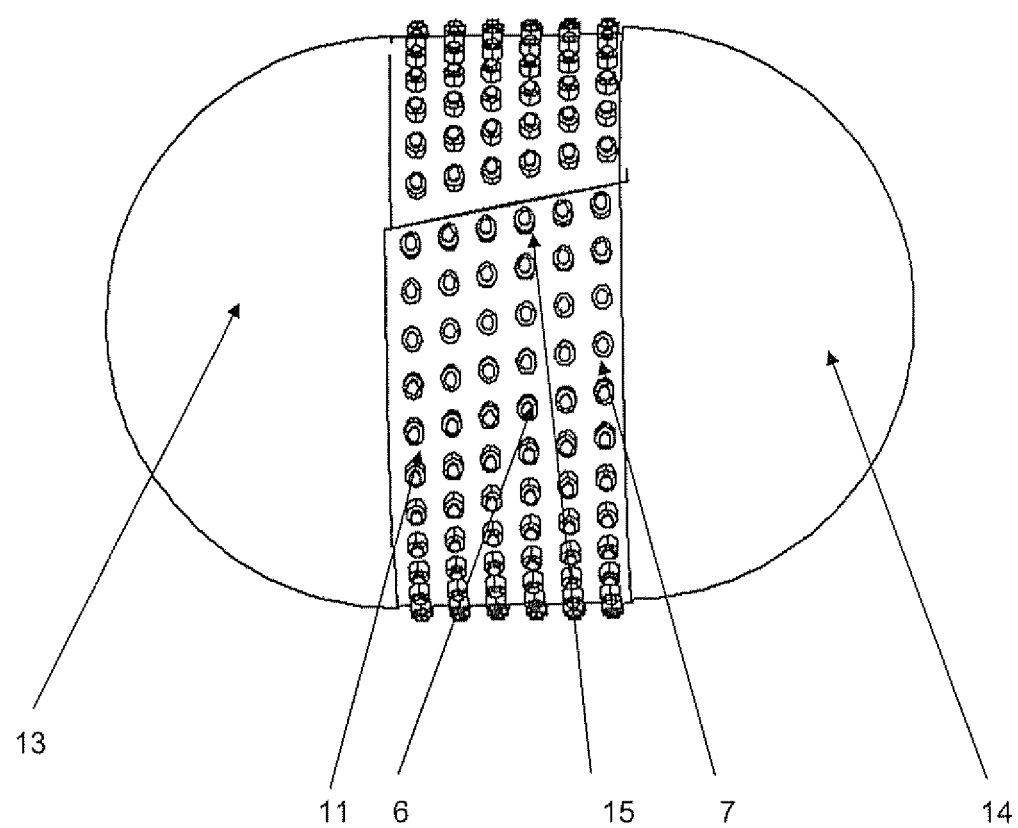
FIG. 9 shows the finished pig.
Figure 10:
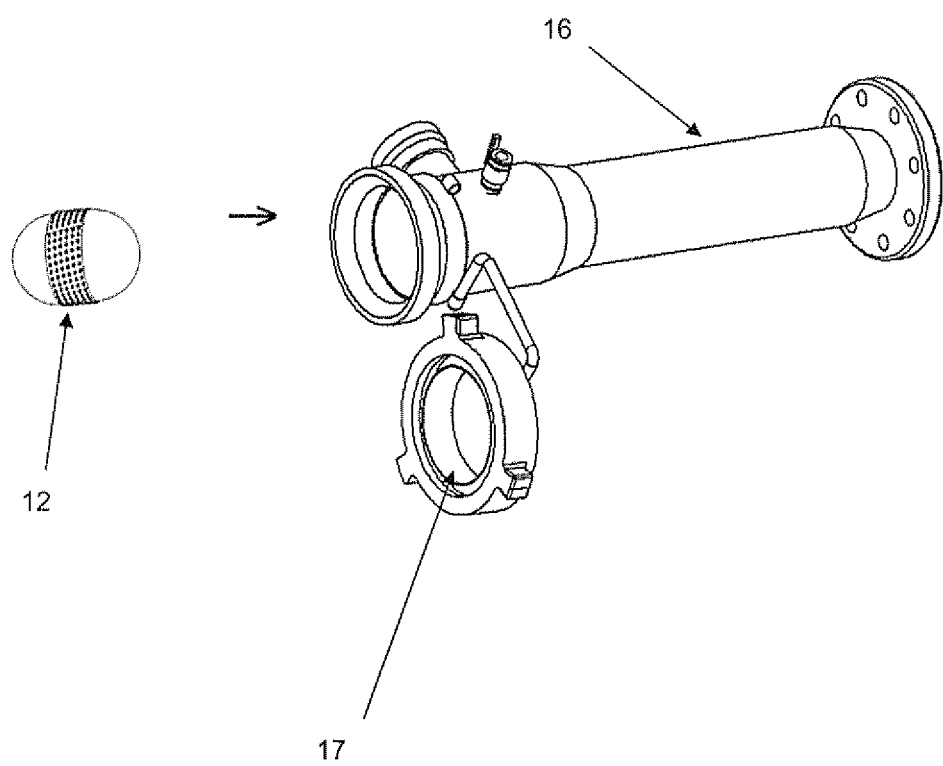
FIG. 10 shows how a pig may be introduced into a tubing system via a launcher.
Figure 11:
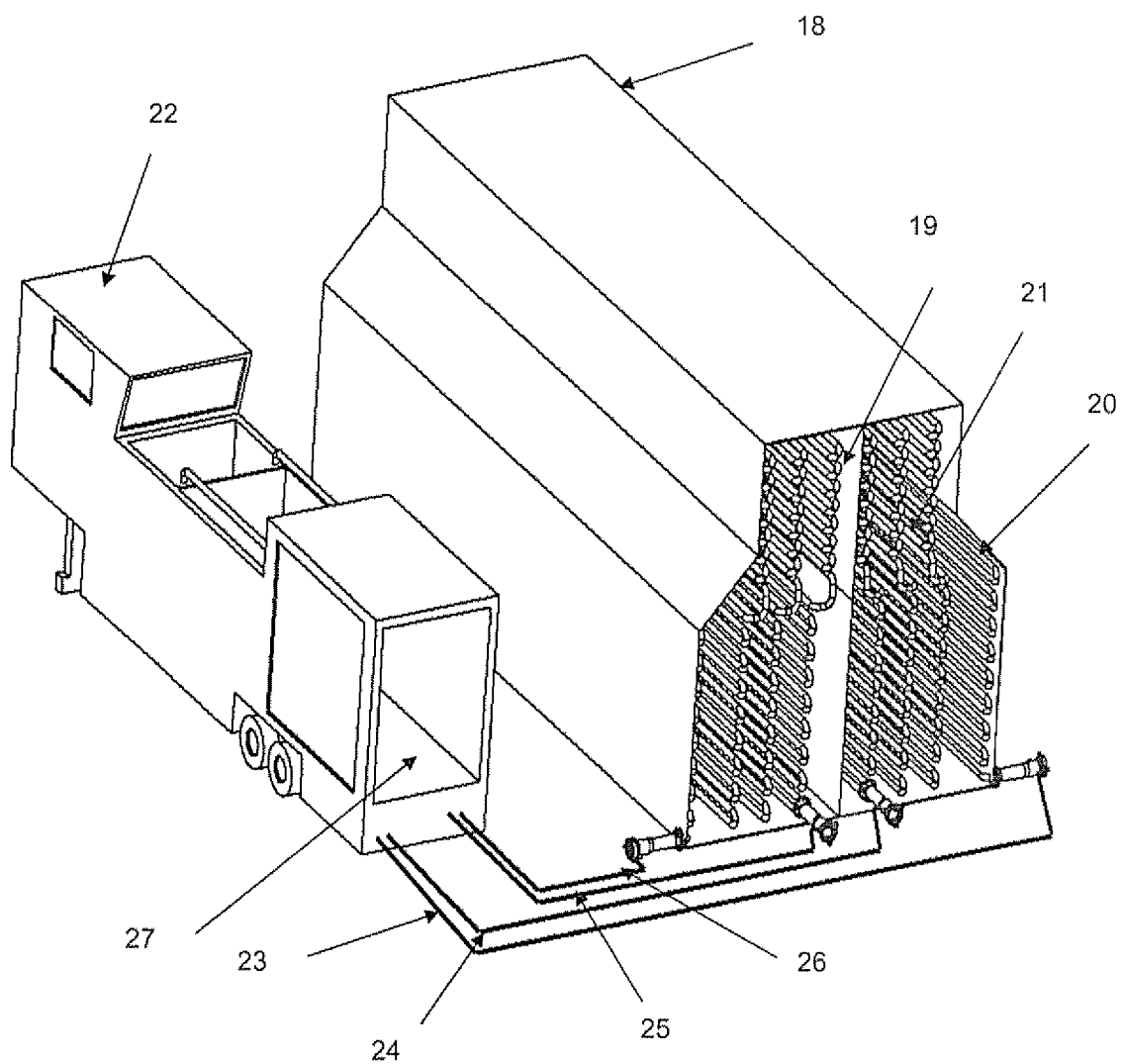
FIG. 11 is a diagrammatic illustration of a furnace system that may be cleaned using a pig of the present invention.

FIG. 1 shows the mould (1) which may be used for casting the core of the pig.
FIG. 2 shows a strap mould (2) provided with a series of projections (3) corresponding to the pattern of studs required on the external surface of the pig.
FIG. 3 shows the strap material (4) being cast on the surface of the strap mould (2).
FIG. 4 shows the strap (5) being loaded with the studs (6) in the desired pattern.
FIG. 5 shows the core (7) with a locating device (30) being mounted in the mould (1).
FIG. 6 shows the strap (5) loaded with the studs (6) being mounted in the mould.
FIG. 7 shows the assembly in the mould ready for the casting of the hardenable material providing a gap between the core and the base of the studs.
FIGS. 8 and 8A show a preferred form of stud (6) having a broad base (8) with a shoulder (9) to key into the hardenable material, a main body (10) and a domed scraping tip (11).
FIG. 9 shows the finished pig (12) comprising the core (7) with a bull nose (13) and (14) at each end provided with a casing (15) from which protrude the studs (6) to provide the scraping tips (11) in the desired pattern.
FIG. 10 shows how a pig (12) can be inserted into a launcher (16) connected to the tubing to be cleaned and the launcher is provided with a cover or door (17) that may be shut and a fluid introduced to drive the pig around a furnace tubing system such as that illustrated in FIG. 11.
FIG. 11 illustrates a furnace used in cracking of hydrocarbons such as crude oil having an upper convection heating system (18) with a tubing structure (19) and a lower radial heating section (20) having a tubing structure (21).
FIG. 11 shows how a specialist pumping unit machine (22) with means to drive the pig in the tubing system may be connected to the tubing system of the furnace by means of piping (23), (24), (25) and (26).

Figure 12:
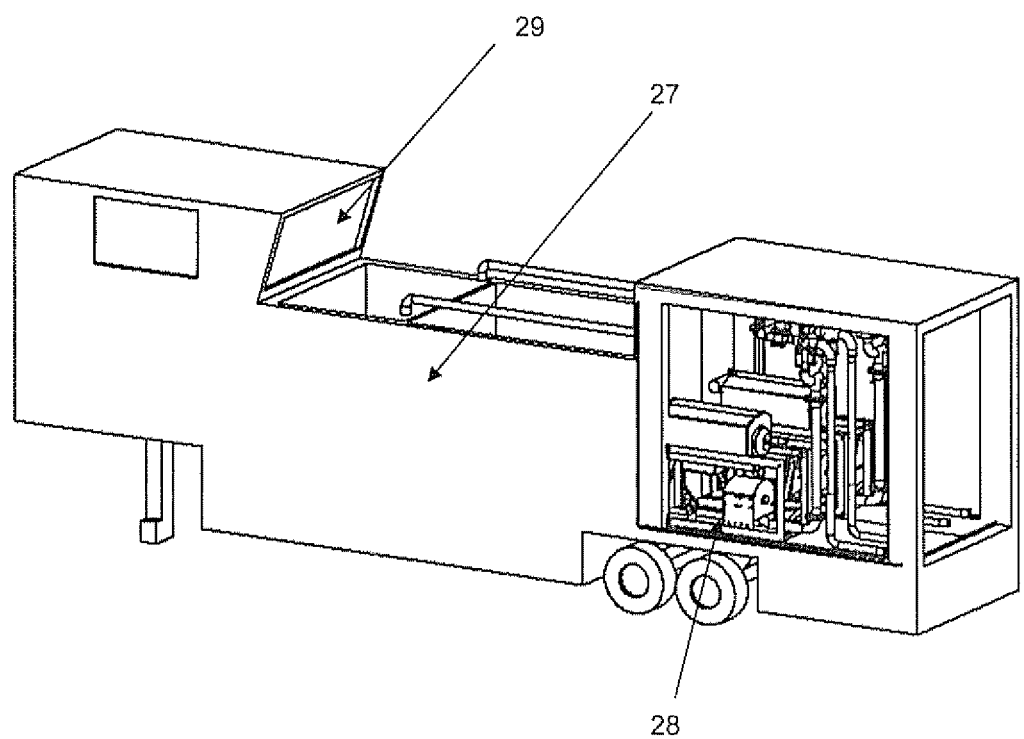
FIG. 12 shows the pumping unit machinery that may be provided at the furnace to provide a system for driving the pig through the tubular system illustrated in FIG. 11.

FIG. 12 shows a specialist pumping unit machine which may be used to drive the pig provided with a fluid (generally water) tank (27), specialist pumping equipment (28) and an observation control room (29).

The pig of the present invention can therefore be inserted into the launcher which can then be connected up to the specialist machine and the fluid pressure applied to drive the pig around the tubing system of the furnace. Progress of the pig through the tube coil can be monitored in the machine control room using bespoke computerised tracking software which provides a display on the integral computer screens. The debris removed by the scraping action of the pig will be carried out by the fluid and observation of the fluid emerging from the system and flowing back into the tanks of the vehicle can give an indication of the cleaning progress and performance. The tank system of the vehicle can be such that the debris can be separated from the water which can then be recycled in further cleaning operations.

The invention claimed is:
1. A scraper pig comprising:
a cylindrical core;
a plurality of studs, wherein each stud has a tip, a body, and a broad base; and
a casing;
wherein the cylindrical core has a torpedo type nose at both ends for assisting in bi-directional passage through a pipe or tube and a recessed central section providing an area for retention of the casing with the studs; and
wherein the plurality of studs
(i) project outwardly from the casing and are oriented so that the broad base is a portion of each stud closest to the cylindrical core and the tip of each stud extends away from the casing and the broad base, and
(ii) are arranged in accordance with a layout in such a way that where a cutting track ends for one stud in a row, an adjacent track is taken up by a stud from another row, so that a 360° cleaning activity is accomplished when the scraper pig is passing through the pipe or tube in either direction with studs sequentially performing a scraping action on unscraped areas of an internal surface of the pipe or tube as the scraper pig is driven through the pipe or tube; and
(iii) wherein each stud is provided with an intermediary shoulder located above the broad base of each stud, wherein the diameter of the intermediary shoulder of each stud is bigger than the diameter of the broad base of each stud and bigger than the diameter of the body of each stud; and
(iv) wherein each stud has an additional shoulder located at the bottom, end of the body of each stud;
wherein the casing
(i) is molded around the external surface of the cylindrical core and around the plurality of studs,
(ii) is bonded to the cylindrical core,
(iii) holds the plurality of studs, wherein each of the bases of each of the studs are firmly molded within the casing and the casing fills a gap between the cylindrical core and the base of each of the studs, and
(iv) comprises a hardenable material between the cylindrical core and the bases of the plurality of studs to prevent the plurality of studs from sinking into the cylindrical core.
2. A scraper pig according to claim 1, wherein the cylindrical core is made out of a flexible and durable material, wherein the cylindrical core has a sufficient amount of flexibility to allow the scraper pig to pass through generally serpentine geometric turns.

3. A scraper pig according to claim 2, wherein the cylindrical core is made of aerated thermoplastic material.

4. A scraper pig according to claim 1, wherein the torpedo type nose at both ends allows the scraper pig to reverse direction in the pipe or tube while maintaining the 360° cleaning activity.

5. A scraper pig according to claim 1, wherein an overall length of each stud of the plurality of studs is 10 to 20 millimeters.

6. A scraper pig according to claim 5, wherein the body of each stud is made of an aluminum alloy.

7. A scraper pig according to claim 1, wherein the intermediary shoulder enhances the keying of the plurality of studs within the casing.

8. A scraper pig according to claim 1, wherein the plurality of studs project from 3 to 6 millimeters from the casing.

9. A scraper pig according to claim 1, wherein the plurality of studs have a shaped tip to provide the ability to cut through the debris in the pipe or tube, wherein the shaped tip has a slightly molded dome of surface area less than that of the broad base of the stud.

10. A scraper pig according to claim 9, wherein the shaped tip is made out of tungsten carbide.

11. A scraper pig according to claim 9, wherein the shaped tip has a slightly molded dome of surface area less than that of the body of the stud.

12. A scraper pig according to claim 1, wherein the cylindrical core contains a locating device which allows the cylindrical core to position itself in a precise location in a mold.

13. A scraper pig according to claim 1, wherein the body of each stud is made of an aluminum alloy.

14. A scraper pig according claim 1, wherein the cylindrical core is made of aerated thermoplastic material.

15. A scraper pig according to claim 14, wherein the cylindrical core contains a locating device which allows the cylindrical core to position itself in a precise location in a mold.

16. A scraper pig according to claim 1, wherein the tip is a shaped tip to provide the ability to cut through the debris in the pipe or tube.

17. A scraper pig according to claim 16, wherein the shaped tip is made out of tungsten carbide.

18. A scraper pig according to claim 17, wherein the shaped tip is flat with a slightly molded dome of surface area less than that of the base of the stud.

19. A scraper pig according to claim 1, wherein the additional shoulder located at the bottom end of the body of each stud has the same diameter as the broad base of each stud.

20. A scraper pig according to claim 1, wherein the plurality of studs project outwardly from the casing and the casing is free of contact with inner walls of the pipe or tube.

* * * * *